T. MOJONNIER.
LIQUID COOLER.
APPLICATION FILED MAR. 1, 1920.

1,437,540.

Patented Dec. 5, 1922.
2 SHEETS—SHEET 2.

Witnesses:
W. F. Kilroy
Harry R. L. White

Inventor
Timothy Mojonnier
By Charles —
Atty.

Patented Dec. 5, 1922.

1,437,540

UNITED STATES PATENT OFFICE.

TIMOTHY MOJONNIER, OF OAK PARK, ILLINOIS, ASSIGNOR TO MOJONNIER BROS. CO., OF CHICAGO, ILLINOIS, A CORPORATION OF ILLINOIS.

LIQUID COOLER.

Application filed March 1, 1920. Serial No. 362,402.

*To all whom it may concern:*

Be it known that I, TIMOTHY MOJONNIER, a citizen of the United States, and a resident of Oak Park, in the county of Cook and State of Illinois, have invented certain new and useful Improvements in Liquid Coolers, of which the following is a specification.

This invention relates to coolers, and while it is particularly an improvement in coolers of special application to sweetened and unsweetened condensed milk, after it leaves the vacuum pan, it also has a general application to the cooling of any fluid both efficiently and economically.

The present cooler is designed to provide for a continual flow of the fluid being cooled and a complete circulation of the cooling or refrigerating agent whereby a relatively small quantity thereof will be used and a minimum floor space occupied in proportion to the cooling capacity of the apparatus.

Likewise, it is the object of the present invention to eliminate pockets of any kind and character from the apparatus, particularly that portion which carries the fluid being cooled, in order that the cleaning and sterilizing thereof may be completely and thoroughly accomplished, making the cooler sanitary in every respect.

With the above and other objects in view, as will be apparent, this invention consists in the construction, combination and arrangement of parts, all as hereinafter more fully described, claimed and illustrated in the accompanying drawings, wherein, Fig. 1 is a central vertical section of a cooler constructed in accordance with the present invention;

Figure 1:
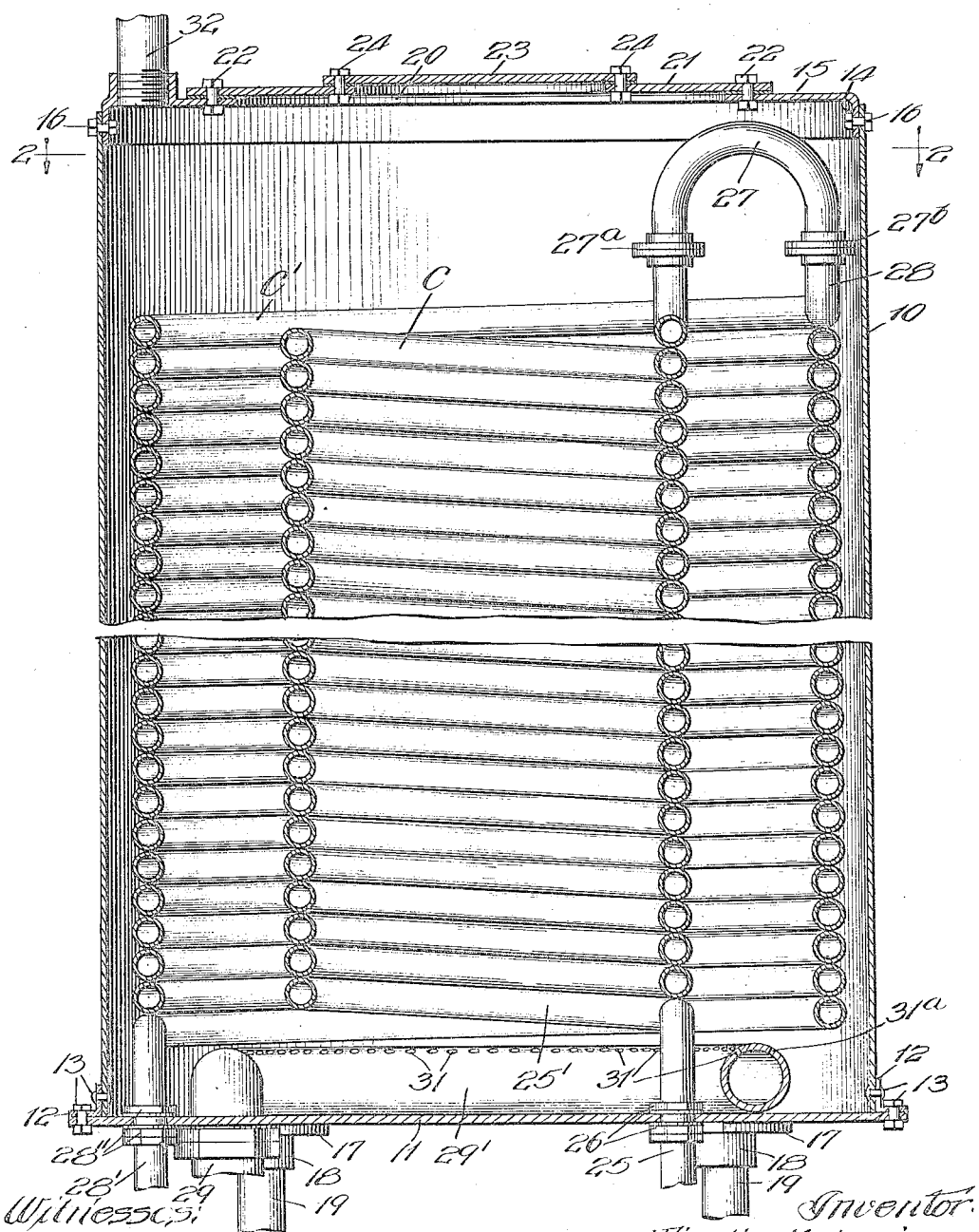
Figure 2:
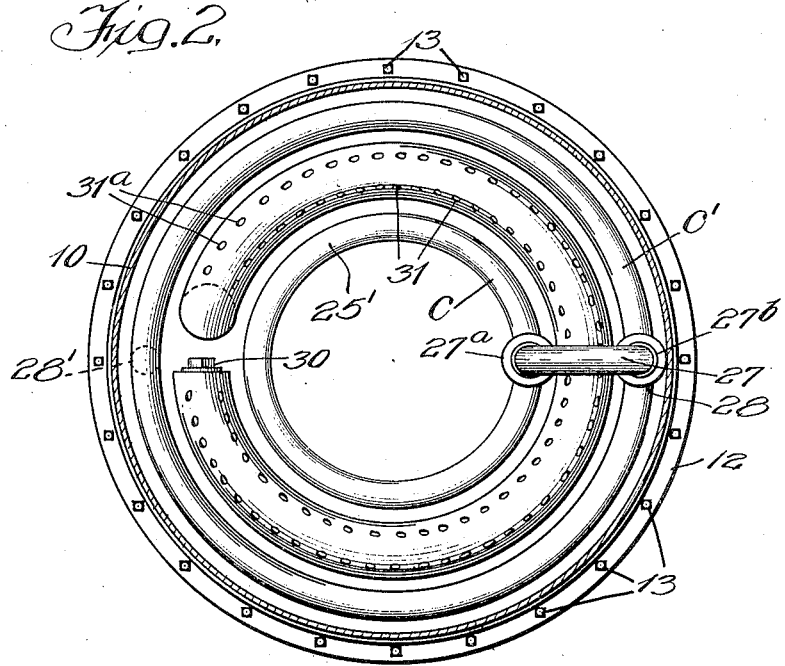
Fig. 2 is a horizontal section taken along line 2—2 of Fig. 1.
Figure 3:
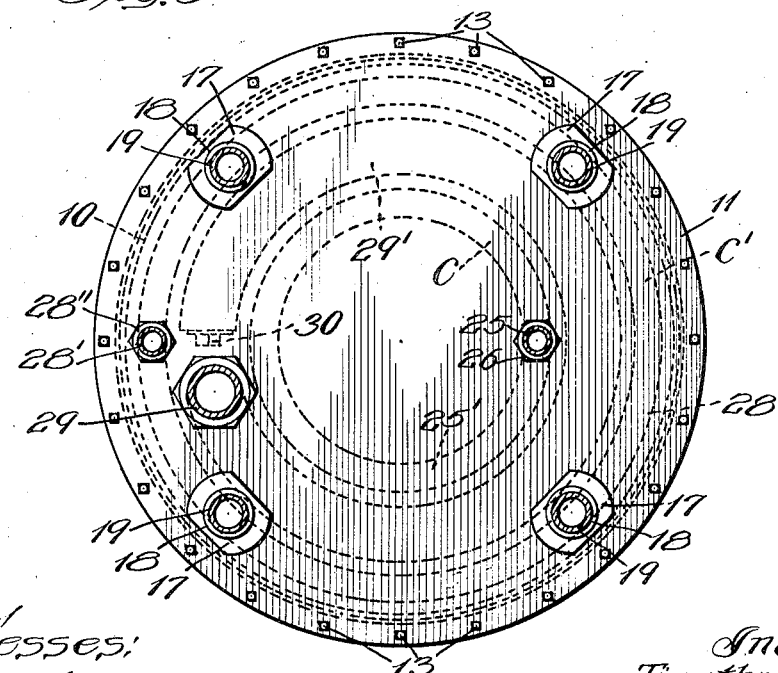
Fig. 3 is a bottom plan view of the cooler.

Heretofore, in the handling of sweetened and unsweetened condensed milk, it has been customary to place the milk, upon delivery from the vacuum pan, in ten gallon cans and cool it therein, or to deliver the milk from a vacuum pan to a relatively large tank in which a refrigerating coil is rotated through the milk or fluid being cooled. Of course the former method is crude in the extreme and improvements thereon are obvious. With respect to the latter method it will be observed that the cooling or refrigerating element is rotated through the milk or fluid being cooled, and hence the cooling surface is, as a result thereof, not only very materially reduced but the uniform cooling of all of the milk in a minimum time is doubtful as its contact with the cooling agent is not entirely accomplished. The present invention has in mind the increase of the cooling surface and the decrease of the size of the cooler in proportion to the cooling surface, particularly with reference to the floor space occupied, and accomplishes this by having a multiple coil within a tank, through which the milk or liquid being cooled is passed from one end of the tank to the other as often as desired, dependent on the number of coils. This multiple coil is entirely submerged in the water, the cooling agent, which is constantly circulated and changing, the system and means whereby the water is circulated and changed being of such a character that a minimum amount of water is consumed in proportion to the cooling surface of the coil.

In carrying out the present invention, and referring more particularly to the drawings, 10 indicates the tank of the cooler, constructed of any suitable material and having its bottom 11, which is of somewhat greater diameter than the diameter of the tank, secured thereto by means of the angle ring 12 resting upon the projecting portion of the bottom 11 and against the outer wall of the tank 10 said angle ring being fixed and held in place by means of the bolts or rivets 13 piercing said angle ring and the bottom 11 and the tank 10. At its upper end the tank 10 receives the lateral flange 14 of the top 15 which rests flush against the wall of said tank and is held in place by the bolts or rivets 16 piercing the lateral flange 14 and the tank 10. It will be observed that the tank 10 has a greater height than its diameter and is designed to rest vertically with respect to its height, and as a consequence thereof occupies a relatively small amount of floor space, especially as distinguished from a horizontal tank.

To support the tank 10 a series of plates 17 are secured to the bottom thereof in any suitable manner and carry the sockets 18 in which are fixed the legs 19.

The top 15 of the tank 10 is centrally orificed to create a manhole 20. It is manifest that any suitable cover may be provided for the manhole 20, but for the purposes of convenience the cover therefor is of such a character that the size of the opening created by the removal of the cover, whereby access may be had through the manhole, may be varied. For this purpose a cover ring 21 is secured to the top 15 by the bolts 22 at the edge of said top, and partially closes the manhole 20. This cover ring also has the cover 23 secured thereto by the bolts 24 which completely closes the opening in said cover ring and in combination with the ring 21 entirely closes the manhole 20. A construction of this character makes it possible to have an opening into the tank through the manhole 20 of the size of the opening in the cover ring 21 by merely detaching the cover 23 from said ring, or an opening the size of the manhole 20 by virtue of allowing the cover 23 to remain in place and merely detaching the ring 22 from the top 15.

A milk or fluid to be cooled inlet pipe 25 passes through the bottom 11 at one side of the vertical axis of the tank 10, the joint 26 between the bottom 11 and the pipe 25 being water-tight. This inlet pipe 25 is connected with or forms a part of a pipe 25' which is bent to create the inner coil C, said coil C being concentric with the tank 10 and extending upwardly through said tank to a point at or near the top thereof. At its free end the pipe 25', constituting the coil C, terminates adjoining an elbow 27, to one end of which it is connected by a water-tight joint 27ª. The opposite end of the elbow 27 is connected by a water-tight joint 27ᵇ to the pipe 28, which is coiled concentrically within the tank 10 and about the coil C to form the outer cooling coil C'. The outer coil C' is spaced from the inner coil C in order that there may be a free circulation of the cooling or refrigerating agent about the coils and the pipes constituting the same. The coil C' extends from the elbow 27 located at the upper end of the tank 10 to the lower end of the tank, where the pipe pierces the bottom 11 of said tank connecting through a water-tight joint 28'' with a discharge pipe 28.' From the foregoing it is clear that the milk or fluid being cooled enters the inner coil C through the pipe 25, passes upwardly through said coil to the elbow 27, by means of which it is conveyed to the coil C', passing through said coil to the discharge pipe 28'. In other words the milk or fluid being cooled passes through the cooling agent two times, once in going upwardly through the coil C, and once in going downwardly through the coil C', so that it is thoroughly cooled to the desired temperature. It is also obvious that the coils C and C' may be multiplied without number.

A water supply pipe 29 pierces the bottom 11 of the tank 10 adjoining the discharge pipe 28' said supply pipe 29 being bent horizontally or connected with a horizontal pipe upon the interior of the tank to form the horizontal distributing pipe 29' which rests flush upon the inner face of the bottom 11 between the lower terminals of the coils C and C'. This distributing pipe 29' is curved concentrically and has its free terminal capped as at 30, and located adjacent to the joint where the supply pipe 29 pierces the bottom 11. This distribution pipe 29' is provided with a double series of apertures 31 and 31ª, the apertures 31 being directed toward the inner coil C and the apertures 31ª being directed to the outer coil C'.

In operation the milk or fluid to be cooled is passed successively through the coils C and C' as heretofore described. Water or other desired cooling agent of any desired temperature is forced through the pipe 29 into the distribution pipe 29'. As a result a current will be directed toward the inner coil C through the apertures 31 and a similar current will be directed toward the outer coil C' through the apertures 31ª. As there is no outlet for the water or other cooling agent, the tank 10 will become entirely filled submerging the coils C and C'. A suitable outlet 32 is provided in the top 15 of the tank for the discharge of the water from the tank 10. The currents operating from the distribution pipe 29' force the water or other cooling agent within the tank upwardly toward the top 15 and out the discharge 32, at the same time maintaining a complete and thorough circulation of said cooling fluid about said coils.

With regard to cleansing the apparatus, a consideration of the drawings of the foregoing descriptive matter demonstrates conclusively that the coils C and C' may be readily cleansed and at no point therein does a pocket or pockets occur, which would prevent a thorough cleansing.

What is claimed is:

1. The combination with a tank, of a plurality of spaced concentric interconnected coils, and a cooling agent distribution means at the bottom of said tank between said coils.

2. The combination with a tank having a discharge outlet in the top thereof, of a plurality of spaced concentric interconnected coils, and a cooling agent distribution means at the bottom of said tank between said coils for submerging said coils and creating a circulation toward said discharge outlet and about each coil.

3. The combination with a tank, of a plurality of successively interconnected coils therein through which a continual fluid flow may be established, and a circular distribution pipe at the bottom of said tank between said coils.

4. The combination with a tank, of a plurality of successively interconnected coils therein through which a continual fluid flow may be established, and a circular distribution pipe at the bottom of said tank between said coils having several series of distribution apertures.

5. The combination with a tank, of an inner coil extending upwardly in said tank, an outer coil extending downwardly in said tank, means connecting said coils at their ends whereby a continual fluid may be maintained in reverse directions therein, and means within said tank and between said coils for distributing a cooling agent toward each of said coils.

6. The combination with a tank, of a multiple coil therein through which a continual flow may be maintained an inlet and an outlet for said coil at one end of said tank, and a circular distribution pipe at the same end of the tank aforesaid.

7. The combination with a tank adapted to contain a cooling agent, a coil in said tank in position to be submerged by the contained cooling agent and adapted to convey a fluid to be cooled, and distributing means at the bottom of the tank for receiving said cooling agent under pressure and discharging the same into the surrounding body of the cooling agent throughout a wide expanse near the bottom of the tank at a velocity greatly exceeding that of the cooling body as a whole in its travel through the cooler, whereby local currents are produced in the cooling body about the lower portions of the coil rather than about its upper portions.

8. The combination with a tank adapted to contain a cooling agent, a coil in said tank in position to be submerged by the contained cooling agent and adapted to convey a fluid to be cooled, and a cooling agent distributing element at the bottom of the tank having a relatively large opening for receiving the agent under pressure and relatively small openings for discharging the same in minute streams into the surrounding body toward the lower portions of the coil to produce increased agitation about the same.

9. The combination with a tank adapted to contain a cooling agent, a coil in said tank in position to be submerged by the contained cooling agent and adapted to convey a fluid to be cooled, and distributing means at the bottom of the tank positioned inwardly of said coil and operative to receive the incoming agent under pressure and to discharge the same radially outward throughout a wide expanse to produce agitating currents in the body of the cooling agent about the lower portions of the coil in excess of those currents produced higher up in the tank.

10. The combination with a tank adapted to contain a cooling agent, a coil in said tank in position to be submerged by the contained cooling agent and adapted to convey a fluid to be cooled, and distributing means at the bottom of the tank positioned outwardly of said coil and operative to receive the incoming agent under pressure and to dischadrge the same radially inward throughout a wide expanse to produce agitating currents in the body of the cooling agent about the lower portions of the coil in excess of those currents produced higher up in the tank.

TIMOTHY MOJONNIER.